Jan. 3, 1956 L. DIETCH 2,729,764

HIGH VOLTAGE SUPPLY

Filed Feb. 3, 1954

INVENTOR.
LEONARD DIETCH

BY [signature]

ATTORNEY 2,729,764

HIGH VOLTAGE SUPPLY

Leonard Dietch, Pennsauken, N. J., assignor to Radio Corporation of America, a corporation of Delaware Application February 3, 1954, Serial No. 407,921

20 Claims. (Cl. 315—22)

This invention relates generally to voltage supplies and more particularly to voltage supplies of the type suitable for use to satisfy the high voltage requirements of a cathode ray tube.

It has become more or less a general practice in the monochrome television art to obtain the high voltage required for the final accelerating electrode of a receiver's kinescope (and the voltage for the focus electrode, where electrostatic focusing is employed) from a pulse type supply. In such pulse type supplies the high voltages are usually developed through rectification of the high amplitude transient voltage pulse appearing across the receiver's horizontal output transformer during each retrace period of the scanning cycle, when cutoff of the horizontal output tube causes a sudden collapse of the magnetic field in the horizontal deflection yoke. Two rectifiers are generally the maximum that are required for the high voltage needs of a black-and-white kinescope, one to develop the focusing voltage, if focus control is electrostatic, and one to develop the higher final anode voltage.

With color kinescopes of the types presently known, however, the high voltage requirements are generally of greater magnitude, more critical as to regulation, and over all present a significantly more complex problem than the monochrome kinescope supplies. As an example, a presently contemplated tri-color kinescope, of the shadow-mask type and incorporating the use of electromagnetic means for effecting convergence of the three scanning beams of the tube, requires a well regulated voltage of approximately 27,000 volts for the tube's final anode (or ultor, as it shall be referred to hereafter), and a voltage adjustable in the range of approximately 7,000 volts to 9,000 volts for the individual focusing electrodes of the tube's three electron guns. To obtain 27 kv. from a television receiver's horizontal output transformer has heretofore been considered as requiring the use of a so-called voltage doubler, which generally calls for three diodes, two serving as rectifiers of the peak amplitude flyback pulses and the third serving as a coupler between the rectifiers to permit the "doubling" action. A separate fourth diode then serves as the focus rectifier; and the sensitivity of the kinescope to variations in the various high voltages generally requires an additional regulator tube to effect stabilization of the supply voltages.

In accordance with an embodiment of the present invention, a marked simplification of a high voltage supply for such purposes is provided, with a reduced tube complement as contrasted with the prior art. Rather than employing conventional voltage doubling, a high voltage supply in accordance with the present invention involves what may be termed as a "one and a half" multiplying action, permitting a combination of focus and ultor rectification which effects a saving of at least one tube. In further accordance with such an embodiment of the present invention, a low impedance focus supply, having very satisfactory regulation, is provided, without suffering the considerable power loss and reduction of net efficiency that prior art supplies of similar characteristics would involve. In further accordance with such an embodiment of the present invention, sampling control of the regulation of the developed high voltages is effected in a novel manner minimizing power losses in such an operation.

Accordingly it is a primary object of the present invention to provide a novel and improved high voltage supply suitable for use with cathode ray tubes.

It is a further object of the present invention to provide a high voltage supply for a color image reproducer with simplified circuitry, minimized tube requirements, and improved efficiency.

It is an additional object of the present invention to provide a novel and improved high voltage supply for a tri-color kinescope with a minimized tube complement and an improved regulation of voltages supplied.

It is another object of the present invention to provide a novel and improved high voltage supply for cathode ray tubes whereby satisfactory regulation may be obtained with minimum power losses.

It is a further object of the present invention to provide a novel and improved focus supply for a cathode ray tube.

Other objects and advantages of the present invention will become apparent to those skilled in the art upon a reading of the following detailed description and an inspection of the accompanying drawing in which.

Figures 1, 2:
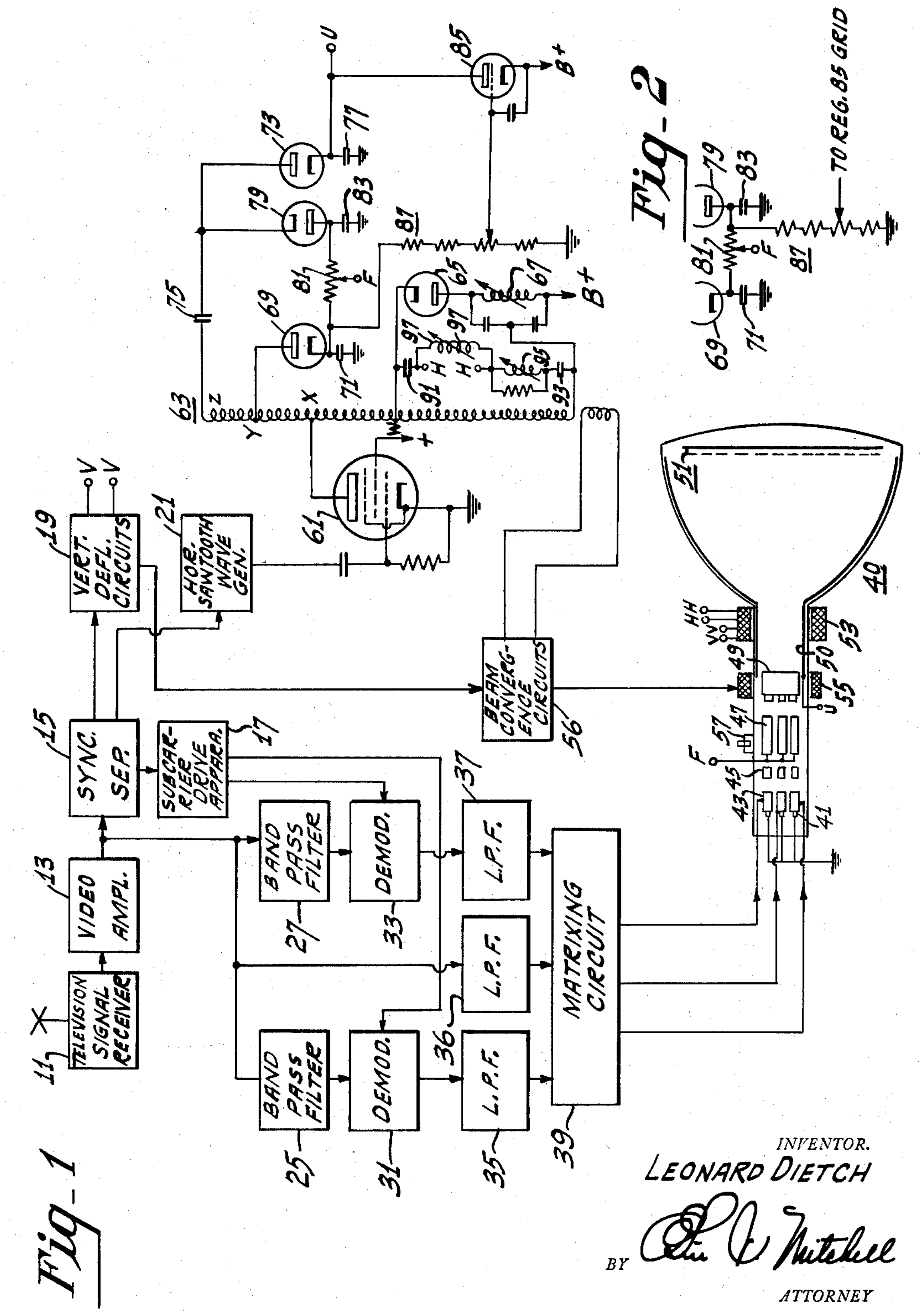
Figure 1 illustrates an embodiment of the present invention employed in satisfying the high voltage requirements of a color television receiver.
Figure 2 illustrates schematically a modification of the embodiment illustrated in Figure 1.

Referring to the drawing in greater detail, a high voltage supply in accordance with an embodiment of the invention is illustrated in the setting of a color television receiver. The illustrated receiver is generally representative of presently contemplated color receivers for a simultaneous subcarrier type color television system in accordance with the revised FCC color standards, and is in general accord with the principles and apparatus discussed in the article entitled "Principles and Development of Color Television Systems," by G. H. Brown and D. G. C. Luck appearing in the June 1953 issue of the RCA Review. Carrier waves modulated by the composite color picture signal are illustrated as being received by conventional signal receiving apparatus 11, which may include the usual R. F. tuner, converting apparatus, I. F. amplifier, signal detector, etc. The video frequency signals recovered from the modulated carrier in the receiving apparatus 11 are amplified in the video amplifier 13. Synchronizing information is derived from the recovered signals in the sync separator 15 and utilized to synchronously control the receiver's subcarrier drive apparatus 17, to control the generation of scanning waves in the vertical deflection circuits 19, and control the generation of horizontal frequency sawtooth voltage waves in the horizontal sawtooth wave generator 21.

Respective color mixture signals (e. g. narrow band $E_Q$ signals and wider band $E_I$ signals, discussed in detail in the aforementioned article) are recovered from the video signal output of amplifier 13 in respective color demodulator channels which include bandpass filters 25 and 27 of respectively appropriate passbands, synchronous demodulators 31 and 33 receiving respectively appropriate phases of the output of the subcarrier drive apparatus 17, and low pass filters 35 and 37 having the respectively appropriate narrow and wider responses. The receiver is also provided with a brightness channel, including a low pass filter 36 having the desired wide band response, through which the broad band monochrome portion of the composite picture signal may pass. The outputs of the brightness channel and two color channels are suitably combined in the matrixing circuits 39 of the receiver to obtain the simultaneous color signals which may be applied to appropriate beam control elements of a color image reproducer 40.

The color image reproducer 40 is illustrated schematically as being of the three-gun, shadow-mask kinescope type. Color image reproducers of this general type are discussed in some detail in an article by H. B. Law entitled "A Three-Gun Shadow-Mask Color Kinescope," and appearing in the October 1951 issue of the Proceedings of the I. R. E. In a color image reproducer of this type, three electron beams are used, one for each primary color. The beams strike a phosphor screen composed of a regular array of red-, green-, and blue-emitting phosphor dots. Between the electron gun position and the phosphor screen, there is placed a thin perforated metal sheet for the purpose of partially masking the electron beams. The phosphor dot array on the screen comprises a plurality of closely spaced phosphor dot trios, each trio consisting of a red-, green-, and blue-emitting phosphor dot with the centers of the dots lying at the corners of an equilateral triangle. The trios themselves lie at the corners of an equilateral triangle of larger size. Associated with each of the phosphor trios is a hole in the video mask, these holes also being located at the corners of an equilateral triangle. The three beams, disposed 120° apart about the tube axis, are converged to a point on the mask by suitable static and dynamic beam converging means. The electron beam which is to contribute the red portion of the picture is prevented, by the mask, from striking those areas on the screen containing blue and green emitting phosphors. Likewise the green and blue beams can strike only the green and blue emitting phosphor dots, respectively. The target structure 51 of the illustrative kinescope 40 may be considered to be of the general shadow-mask type above described.

As schematically illustrated, the three electron beams are developed and shaped in respective electron gun structures, each including a thermionic cathode 41, a control grid 43, a first anode or accelerating electrode 45, and a focusing electrode 47. The electron gun structures may be of the general type disclosed in the co-pending application of Hannah C. Moodey, Ser. No. 295,225, filed June 24, 1952, and disposed symmetrically about the tube axis such as to produce three substantially parallel beams as in said Moodey application, or may be inclined at respective angles to the tube axis so as to provide three beams substantially converging at a common point on the target, as in the co-pending application of Albert M. Morrell, Ser. No. 364,041, filed on June 25, 1953. A common convergence "cup" 49 may be provided for receiving the three focused beams, and which may serve as the convergence electrode where electrostatic convergence is employed, or which may merely serve to provide a confined region in which electromagnetic convergence is employed. In the illustrative embodiment of the present invention, the color kinescope 40 is shown as employing a convergence yoke 55 to provide the electromagnetic form of convergence control. The electromagnetic convergence apparatus may be entirely external of the tube 40, but where individual control of the three beams is desired, the apparatus may incorporate internal pole pieces. The individual control of the three beams by electromagnetic convergence apparatus is disclosed in the copending application of Hunter C. Goodrich, entitled "Electromagnetic Beam Convergence Systems for Tri-Color Kinescopes," Ser. No. 322,653, filed November 26, 1952, now U. S. Patent No. 2,707,248, issued April 26, 1955. Electromagnetic convergence apparatus of the individual beam control type and involving the employment of internal pole pieces is disclosed in the aforesaid co-pending Morrell application.

In an article entitled "Deflection and Convergence in Color Kinescopes" by Albert W. Friend appearing in the October 1951 issue of the Proceedings of the I. R. E., the use of beam alignment magnets to correct beam trajectories individually is discussed. While three such beam alignment magnets have often been employed in shadow-mask type kinescopes for correction purposes, it is indicated in the aforementioned co-pending Goodrich application that where individual adjustment of the beam positions in a radial direction relative to the tube axis is provided by the electromagnetic convergence apparatus, a single beam alignment magnet associated with one of the three beams and effective in adjusting such beam in a direction perpendicular to the radial convergence adjustment for that beam provides sufficient control. In the aforesaid Morrell application, the single beam alignment magnet thus required is illustrated as cooperating with another set of internal pole pieces to provide the individual beam alignment control desired. In a second co-pending application of Albert M. Morrell, Ser. No. 383,340, filed September 30, 1953, and entitled "Tri-color Kinescope," an improved form of such internal pole pieces for the beam alignment magnet is shown. In the co-pending application of M. Obert, entitled "Electron Beam Control Means," filed January 21, 1954, Ser. No. 405,445, a single beam alignment magnet of the permanent magnet type and utilizing such improved internal pole pieces is shown.

In the drawing herein, the electromagentic convergence apparatus has been illustrated by the schematic representation of a yoke 55, and the details of the internal pole pieces and individual yokes which may specifically be employed in accordance with the aforesaid applications have not been illustrated for the sake of simplicity in the drawing. Similarly the beam alignment magnet 57 has been illustrated only schematically, but may for example take a permanent magnet form as illustrated in the aforementioned co-pending Obert application.

Beam convergence circuits for appropriately energizing the convergence yoke 55 have been indicated in the drawing by the block 56, which is illustrated as deriving sawtooth wave energy of field and line frequency from the vertical deflection circuits 19 and horizontal output transformer 63, respectively. The convergence circuits 56 may be, for example, of the general type described in the aforementioned A. W. Friend article and thus involve derivation of essentially parabolic current waves from the respective sawtooths, and combination of these parabolic (dynamic convergence) waves with the requisite (static convergence) D.-C. component.

The kinescope is provided, as is conventional, with a final accelerating electrode, the ultor 50, which may take the usual form of a conductive coating on the inner surface of the kinescope 40 extending from the vicinity of the convergence cup 49 to the beam target structure 52. Where the flared portion of the kinescope envelope is of metal, the conductive coating need only extend forward sufficiently to make electrical contact with the metal flared portion.

To achieve common deflection of the three beams to trace a scanning raster on the target structure 51 a deflection yoke 53 is provided with appropriately disposed horizontal and vertical deflection windings. The yoke 53 is illustrated as having vertical yoke terminals V—V, to which field frequency scanning waves developed in the vertical deflection circuits 19 are applied. The horizontal yoke terminals H—H derive line frequency scanning waves from the horizontal output transformer 63 (illustrated as an autotransformer) of the horizontal output system, which conventionally includes a horizontal output tube 61, energized by sawtooth voltage waves from generator 21 and developing a current which provides the desired scanning sawtooth in the horizontal yoke. To prevent the transient flyback pulses generated during retrace periods from setting up a series of oscillations, and in accordance with well-known reaction scanning principles, a damper tube 65 is provided. The details of the yoke and damper connections and associated circuitry including the provision of B-boost capacitors, linearity control inductance 67, D.-C. blocking capacitors 91, 93, combination series-shunt inductance type raster width control 95, 97, etc. are illustrative only, and various modifications, augmentations or revisions thereof may be achieved without departing from the scope of the present invention. Thus, for example, modifications of the illustrated connections to additionally provide circuits for effecting a horizontal centering adjustment, to additionally provide circuits for discouraging ringing in the yoke, to provide a different type of raster width control, etc. are readily compatible with the operation of the high voltage supply associated with the horizontal output transformer 63, the supply forming the particularly novel subject matter of the present invention and now to be described.

The high voltage supply is illustrated as including a first rectifier, diode 69, with its plate tapping the output transformer 63 at an intermediate point Y between the output tube connecting point X and the high potential terminal Z. The transient flyback pulses appearing periodically at the upper yoke connecting point W are stepped up at point Y by the autotransformer action, and appear at the plate of diode 69 as moderately high positive pulses. As these pulses are rectified by diode 69, a D.-C. potential is built up on capacitor 71, which is connected between the cathode of diode 69 and a point of reference potential (i. e. ground in the illustrative embodiment). The D.-C. voltage at the cathode of diode 69 is coupled through resistor 81 and the coupling diode 79 (the polarity of the latter's connection being such as to present a low impedance to the positive D.-C. voltage) to the plate of a second rectifier, diode 73, said second rectifier's plate being coupled to the high potential terminal Z via the capacitor 75. Capacitors 83 and 77 are coupled between the plate of coupler 79 and ground, and between the cathode of rectifier 73 and ground, respectively.

The D.-C. voltage at diode 69's cathode, minus the voltage drop across resistor 81 and plus the rectified negative pulse excursion of the cathode of coupler 79, is impressed as a D.-C. potential on capacitor 75. This D.-C. potential effectively adds to the amplitude of the high potential pulse at terminal Z to present a positive voltage pulse of augmented amplitude to the plate of diode 73 for rectification thereby. The raised D.-C. potential thus appearing at the cathode of diode 73 is directly applied to the ultor voltage output terminal U, which as illustrated is directly connected to the ultor 50 of the color kinescope 40.

The resistor 81 in the coupler path of the voltage multiplying system just described (not truly a voltage doubler, but rather affecting what might be roughly considered as a "1½" multiplication) is illustrated as functioning as the focus voltage adjusting potentiometer, there being provided a variable tap on the resistor coupled via terminal F to the focus electrodes 47 of the electron guns of the kinescope 40.

To effectively regulate the derived high voltage, a regulator tube 85 is connected in shunt with the output of the rectifier 73, the regulator tube 85 serving to compensatorily vary its loading on the high voltage supply as ultor loading varies. It has heretofore been customary to derive the sampling or reference potential for the regulator's control electrode from a resistive voltage divider or potentiometer coupled between the high voltage output terminal and ground. An appreciable reduction in power losses and improvement in overall efficiency of the deflection and high voltage system results, however, if, as in accordance with the illustrative embodiment, the sampling potential is rather derived from a voltage divider (potentiometer 87) coupled between a lower potential point, such as the cathode of the first rectifier 69, and ground. It has been found that the critical regulation requirements for the high voltages of a color kinescope may be satisfactorily effected by such a sampling of a lower potential component of the developed ultor voltage.

Figure 2 illustrates a modification of the embodiment of Figure 1, the modification involving the coupling of reference potentiometer 87 to the plate of the coupling diode 79, rather than to the cathode of diode 69. Sampling is thus effected with power loss savings of a similar order, and with the added advantage of increasing the focus adjustment range since the current drawn by the reference potentiometer 87 now flows through the focus potentiometer 81.

The advantages of the illustrated manner of obtaining adjustable focus voltages for the color kinescope, i. e. the use therefor of a potentiometer 81 in the coupler path of the voltage multiplier, should be noted. It may be observed that the regulated ultor current flows through the potentiometer 81, thus providing a variable focus supply of low internal impedance and with very satisfactory regulation. In practice heretofore, the accomplishment of a low impedance focus supply with similar characteristics required a stiff bleeder to ground, which necessarily involved considerable power loss and reduction of overall efficiency.

In a working embodiment of the present invention which satisfactorily supplied the high voltages required by a tri-color kinescope of the type previously discussed, the following circuit constants were employed for the illustrated elements: capacitors 71, 75 and 83—1200 $\mu\mu$ f.; capacitor 77—4000 $\mu\mu$ f.; resistive divider 87—50 megohms, 15 megohms, 1 megohm and 2 megohms in series; diodes 73 and 79—type R6433, diode 69—type R6434 and regulator 83—type A2334C.

There has thus been described a novel and improved high voltage supply suitable for satisfying the high voltage requirements of a color kinescope. By use of a novel "one and one-half" voltage multiplying arrangement, focus and ultor rectifiers are combined in a manner effecting a saving in tube complement over the use of a conventional voltage doubler and separate focus rectifier as heretofore considered requisite. A well regulated, low impedance focus supply is provided with a saving in power losses over prior practice. Also in accordance with the present invention, sampling control of the high voltage regulation is effected with a minimum of power losses.

It will be appreciated that while the present invention has been described with relation to satisfying the high voltage requirements of particular types of color kinescopes, the novel features of the invention may be employed to advantage in satisfying the high voltage requirements of other types of color kinescopes, such as those employing electrostatic beam convergence means, and may in general be applied to voltage supplies of a variety of other purposes.

Having thus described my invention, what is claimed is:

1. In a cathode ray tube system including a transformer periodically energized by pulses, a high voltage power supply comprising in combination first rectifying means coupled to an intermediate point on said transformer for developing a first unidirectional potential from said pulses, second rectifying means, a capacitor, said capacitor coupling said second rectifying means to a point on said transformer of higher pulse potential than said intermediate point, a D.-C. coupling means connected between said first and second rectifying means in such manner that a potential substantially equivalent to said first unidirectional potential is impressed on said capacitor whereby said second rectifying means develops a second unidirectional potential substantially equivalent to the sum of said higher pulse potential and said first unidirectional potential.

2. A cathode ray tube system in accordance with claim 1 wherein said cathode ray tube includes a focus electrode, and wherein operating potential for said focus electrode is derived from said D.-C. coupling means.

3. Apparatus in accordance with claim 2 wherein said cathode ray tube includes an ultor electrode, and wherein said ultor electrode is coupled to said second rectifying means.

4. A cathode ray tube system in accordance with claim 3 including means for regulating said developed potentials, and wherein said regulating means includes voltage variation sensing means coupled to said D.-C. coupling means.

5. A cathode ray tube system in accordance with claim 1 including means for regulating said developed potentials, said regulating means being controlled by the sampling of a potential of the order of said first unidirectional potential.

6. In a color television receiver including a color kinescope requiring a D.-C. focusing voltage of a first order and an ultor voltage of a second higher order, said receiver also including a deflection wave output transformer in which flyback pulses periodically appear, a high voltage supply comprising in combination first rectifying means coupled to said transformer for developing a D.-C. potential of said first order from said periodic flyback pulses, means for adding the developed D.-C. potential of said first order to flyback pulses derived from said transformer, and second rectifying means coupled to said adding means for developing a second unidirectional potential of said second order from the sum of said D.-C. potential of said first order and said latter derived flyback pulses.

7. A high voltage supply in accordance with claim 6 including voltage regulating means shunting the output of said second rectifying means, and means for controlling said voltage regulating means in accordance with variations in said D.-C. potential of said first order.

8. In a color television receiver including a color kinescope comprising an electrostatic focusing electrode and a final accelerating electrode, said receiver also including a horizontal deflection wave output transformer, and a horizontal deflection yoke coupled across a portion of said horizontal output transformer, flyback pulses developed in said transformer portion during periodic retrace periods appearing with successively higher potentials at respective first and second points on the remaining portion of said transformer, a high voltage supply comprising in combination first rectifying means coupled to said first point on said transformer for developing a first unidirectional potential from flyback pulses of stepped-up potential, second rectifying means coupled to said second point on said transformer for rectifying flyback pulses of a relatively higher stepped-up potential, a coupling path between said first and second rectifying means for effectively adding said first unidirectional potential to said flyback pulses of relatively higher stepped-up potential whereby flyback pulses of augmented amplitude are presented to said second rectifying means, said coupling path including means presenting a high impedance to said flyback pulses of a relatively higher stepped-up potential and a low impedance to said first unidirectional potential, means for coupling said focus electrode to said coupling path, and means for coupling said final accelerating electrode to the output of said second rectifying means.

9. A high voltage supply in accordance with claim 8 wherein said focus electrode coupling means comprises a resistance included in said coupling path and an adjustable tap on said resistance coupled to said focus electrode.

10. A high voltage supply in accordance with claim 9 including a regulator tube comprising a space discharge path and a control electrode, said space discharge path being connected in shunt with the output of said second rectifying means, and a voltage divider coupled between one end of said resistance and a point of reference potential, said control electrode being coupled to a point on said voltage divider.

11. In a color television receiver including a source of periodic flyback pulses and requiring an adjustable focus voltage of a first order of potential and an ultor voltage of a second higher order of potential, a high voltage supply comprising the combination of a first diode for rectifying flyback pulses to obtain a D.-C. voltage of said first order, means for adding said D.-C. voltage to flyback pulses of a higher potential than those rectified by said first diode, a second diode for rectifying the output of said adding means, means for utilizing the output of said second diode as said ultor voltage, and means for deriving said adjustable focus voltage from said adding means.

12. A high voltage supply in accordance with claim 11 including means for regulating said ultor voltage in accordance with variations in said focus voltage.

13. In a cathode ray tube system, a high voltage power supply comprising, in combination, a transformer, first rectifying means coupled to an intermediate point on said transformer for developing a first unidirectional potential, second rectifying means, a capacitor, said capacitor coupling said second rectifying means to a point on said transformer of higher potential than said intermediate point, and D.-C. coupling means connected between said first and second rectifying means such that a potential substantially equivalent to said first unidirectional potential is impressed on said capacitor whereby said second rectifying means develops a second unidirectional potential substantially equal to the sum of said higher potential and said first unidirectional potential.

14. Apparatus in accordance with claim 13 including voltage regulating means shunting the output of said second rectifying means, and means for controlling said voltage regulating means in accordance with variations in said first unidirectional potential.

15. Apparatus in accordance with claim 13 wherein said cathode ray tube includes a focus electrode, and wherein operating potential for said focus electrode is derived from said D.-C. coupling means.

16. In a color television receiver including a color kinescope and a deflection wave transformer subject to the periodic appearance of flyback pulses, a high voltage power supply for developing an ultor voltage for said color kinescope comprising in combination a first rectifier having an input electrode and an output electrode, means for coupling said first rectifier input electrode to an intermediate point on said transformer, a second rectifier having an input electrode and an output electrode, means for capacitively coupling said second rectifier input electrode to a point on said transformer of higher flyback pulse potential than said intermediate point, and unidirectional coupling means effectively coupled between said first rectifier output electrode and said second rectifier input electrode, said ultor voltage being derived from said second rectifier output electrode.

17. A high voltage power supply in accordance with claim 16 also developing a focus voltage for said color kinescope, said supply including means for adjustably deriving said focus voltage from the output of said first rectifier.

18. In a color television receiver including a color kinescope and a deflection wave output transformer subject to the periodic appearance of flyback pulses, a high voltage supply for developing D.-C. focus and ultor voltages for said color kinescope, said supply comprising in combination a focus rectifier coupled to an intermediate point on said transformer for developing a D.-C. focus voltage from the flyback pulses periodically appearing at said intermediate point, a second rectifier having an input electrode coupled to a point on said transformer of higher flyback pulse potential than said intermediate point, and means for applying the output of said focus rectifier to said second rectifier input electrode, said second rectifier developing a D.-C. ultor voltage from the combination of said focus rectifier output and the flyback pulses periodically appearing at said higher potential point.

19. In a color television receiver including a color kinescope and a deflection wave transformer subject to the periodic appearance of flyback pulses, a high voltage power supply for said color kinescope comprising in combination a focus rectifier having an input electrode and an output electrode, said focus rectifier being coupled to an intermediate point on said transformer, a second rectifier having an input electrode and an output electrode, means for capacitively coupling said second rectifier input electrode to a point on said transformer of higher flyback pulse potential than said intermediate point, a coupling diode, and means for connecting said coupling diode between said focus rectifier output electrode and said second rectifier input electrode.

20. In a color television receiver including a color kinescope and a deflection wave transformer subject to the periodic appearance of flyback pulses, a high voltage power supply for said color kinescope comprising in combination a focus rectifier having an anode and a cathode, said focus rectifier anode being coupled to an intermediate point on said transformer, a second rectifier having an anode and a cathode, means for capacitively coupling said second rectifier anode to a point on said transformer of higher flyback pulse potential than said intermediate point, a coupling diode, and means for connecting said coupling diode between said focus rectifier cathode and said second rectifier anode, said diode being poled with respect to said connecting means to present a very high impedance to the flyback pulses capacitively coupled to said second rectifier anode.

References Cited in the file of this patent

UNITED STATES PATENTS

| | | |
|---|---|---|
| 2,536,857 | Schade | Jan. 2, 1951 |
| 2,543,304 | Schwarz | Feb. 27, 1951 |
| 2,579,014 | Schlesinger | Dec. 18, 1951 |
| 2,588,652 | Nelson | Mar. 11, 1952 |
| 2,646,532 | Hazeltine | July 21, 1953 |
| 2,655,615 | Seldin | Oct. 13, 1953 |
| 2,668,911 | Schlesinger | Feb. 9, 1954 |